United States Patent [19]

Yanagawa et al.

[11] Patent Number: 5,371,725
[45] Date of Patent: Dec. 6, 1994

[54] POSITION CONTROL SYSTEM FOR A READ-WRITE HEAD OF A MAGNETO-OPTICAL DISC PLAYER HAVING HEADS WHICH MOVE INDEPENDENTLY FROM EACH OTHER

[75] Inventors: Naoharu Yanagawa; Shoji Taniguchi, both of Saitama, Japan

[73] Assignee: Pioneer Electronic Corporation, Tokyo, Japan

[21] Appl. No.: 955,373

[22] Filed: Oct. 1, 1992

[30] Foreign Application Priority Data

Feb. 27, 1992 [JP] Japan .................................. 4-76021

[51] Int. Cl.$^5$ .................. G11B 7/00; G11B 21/10; G11B 5/09; G11B 15/52
[52] U.S. Cl. ................ 369/44.28; 369/44.34; 369/54; 369/55; 369/50
[58] Field of Search .................. 360/59, 114, 106, 133; 369/13, 44.22, 43, 55, 56, 47, 53, 44.28, 44.34, 50, 54; 250/560

[56] References Cited

U.S. PATENT DOCUMENTS

| | | | |
|---|---|---|---|
| 4,473,750 | 9/1984 | Oshida et al. | 250/560 |
| 4,583,212 | 4/1986 | Korde et al. | 360/106 X |
| 4,590,529 | 5/1986 | Nikaido et al. | 360/106 |
| 4,868,802 | 9/1989 | Kobori | 360/114 X |
| 5,040,167 | 8/1991 | Tanaka et al. | 360/133 X |
| 5,179,544 | 1/1993 | Hezemans et al. | 360/59 X |
| 5,191,562 | 3/1993 | Hensing et al. | 369/13 |
| 5,193,080 | 3/1993 | Mohri et al. | 360/59 X |
| 5,239,532 | 8/1993 | Hensing et al. | 360/59 X |

FOREIGN PATENT DOCUMENTS 390259 10/1990 European Pat. Off. .

OTHER PUBLICATIONS

Patent Abstracts of Japan, vol. 13, No. 322 (P-902) (3670), Jul. 20, 1989 Japanese Patent Publication 1-89054, Apr. 3, 1989, Tsutonu Matsui "Magneto-Optical Device".

*Primary Examiner*—John Shepperd
*Assistant Examiner*—Patrick Wamsley
*Attorney, Agent, or Firm*—Nikaido, Marmelstein, Murray & Oram

[57] ABSTRACT

A read-write head of a magneto-optical disc player has an optical head having an optical pickup, and a magnetic head having an electromagnet. The optical head and the magnetic head are each slidably held by guide members so as to be moved in a radial direction of an optical disc. A motor is mounted on each head for moving the head along the guide member. A relative position between both heads at a position where both heads oppose each other is detected, and both heads are moved along the guide members, maintaining the relative position.

4 Claims, 7 Drawing Sheets

POSITION CONTROL SYSTEM FOR A READ-WRITE HEAD OF A MAGNETO-OPTICAL DISC PLAYER HAVING HEADS WHICH MOVE INDEPENDENTLY FROM EACH OTHER

FIELD OF THE INVENTION

The present invention relates to a read-write head of a magneto-optical disc player, and more particularly to an improved head capable of quickly searching an area on an optical disc.

BACKGROUND OF THE INVENTION

There are optical discs such as a CD including a read only CD and a writable CD-R disc which is used as a ROM. Further, as a writable optical disc having a high recording density, a write once disc and a magneto-optical disc are provided. Information is recorded on the disc and reproduced with a laser beam. These discs are different from the CD in the material of the recording surface.

For example, the write once disc has a tellurium or bismuth recording surface on which the lasers burn pits for recording. In another type of the write once disks, the lasers are focused on a recording surface coated with a selenium antimony ($Sb_2Se_3$) thin film, or an oxide tellurium (TeOx) thin film, or a thin film of organic pigment, changing the reflectivity of the light.

The magneto-optical disc uses as the recording surface, an amorphous alloy made of rare earth metals such as gallium, terbium, and others. In a magneto-optical recording method, the recording surface of the disc is initially magnetized to form a magnetic field in a direction perpendicular to the surface. The laser heats a predetermined area of the disc to elevate the temperature above Curie temperature, which is about 150° C., thereby a magnetic head subsequently reverse the direction of the magnetic field. To read the recorded information, the laser is radiated onto the recording surface so that polarized wave front slightly rotates as a result of the Kerr effect. Thus only the polarized wave deflected by the rotation is read by a photodetector, thereby enabling reading of the information.

Referring to FIG. 6, a conventional read-write head for recording information on a magneto-optical disc 1 and reading the information therefrom has a magneto-optical pickup 2 disposed under the disc 1 and a magnetic head 3 disposed above the disc. The pickup 2 and the magnetic head 3 are connected with each other by way of a connecting member 4. The connecting member 4 maintains the relative position between the pickup 2 and the magnetic head 3 constant, so that an area on the disc subjected to a magnetic field of the magnetic head 3 coincides with an area subjected to a laser beam 5 from the pickup 2.

In order to record information on the disc 1, the read-write head is radially moved to an appropriate position of the disc 1. The laser beam 5 from the pickup 2 heats the surface of the disc 1 to Curie temperature. A magnetic field, caused by the magnetic head dependent on the information which is to be recorded, reverses the direction of the magnetic field on the disc. The information can be written in an area which is already written by modulating the direction of the magnetic field.

Since the magnetic head 3 and the pickup 2 are held together by the connecting member 4, the read-write head is relatively heavy. Hence the head cannot be quickly moved in a radial direction of the disc, which prevents a rapid search of an area on the disc.

Moreover, with the lapse of time, the pickup 2 and the magnetic head 3 may be displaced from each other due to a deformation of the connecting member 4. As a result, the reliability of the optical disc player reduces. In addition, since the connecting member 4 must have a large length in the radial direction of the disc, the player cannot be made much compact.

SUMMARY OF THE INVENTION

An object of the present invention is to provide a read-write head for a disc player which may be reduced in weight, thereby enabling quick search of a determined area on a disc.

According to the present invention there is provided read-write head of a magneto-optical disc player comprising an optical head having an optical pickup, and a magnetic head having an electromagnet. The optical head/and the magnetic head each has driving means so as to be moved in a radial direction of the disc, and detecting means for detecting the radial position of the head. A control means is provided to control the driving means in accordance with the position of each of the optical head and the magnetic head detected by the detecting means.

In the read-write head of the present invention, the detecting means detects the radial positions of the optical head and the magnetic head. The control means operates the driving means to move the heads oppose to each other.

These and other objects and features of this invention will become understood from the following description with reference to the accompanying drawings.

DETAILED DESCRIPTION OF THE PREFERRED EMBODIMENTS

Figure 1:
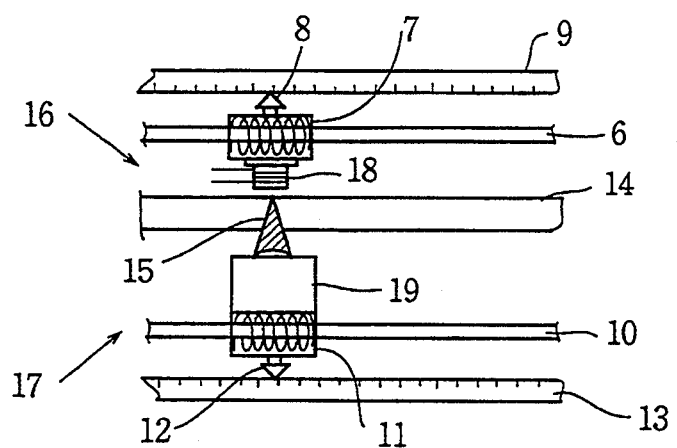
FIG. 1 is a sectional view of a read-write head of magneto-optical disc player according to the present invention.

Referring to FIG. 1, a read-write head according to the present invention comprises a magnetic head 16 and an optical head 17, positioned over and under a magneto-optical disc 14, respectively. The magnetic head 16 has a linear motor 7 which is slidably mounted on a guide rail 6 extending in a radial direction of the disc 14, and an electromagnet 18 mounted on the underside of the linear motor 7. On the upper side of the motor 7 is provided a position sensor 8 which detects the position of the magnetic head 16. The position sensor 8 detects a position on a linear scale 9 provided in parallel to the guide rail 6 by detecting a change in magnetic field thereof.

The optical head 17 has a linear motor 11 slidably mounted on a guide rail 10 extending in the radial direction of the disc 14. An optical pickup 19 which applies a semiconductor laser beam 15 to the disc 14 is mounted on the linear motor 11. A linear scale 13 and a position sensor 12, which are similar to those of the magnetic head 16, are provided to detect the position of the optical head 17.

Figure 2:
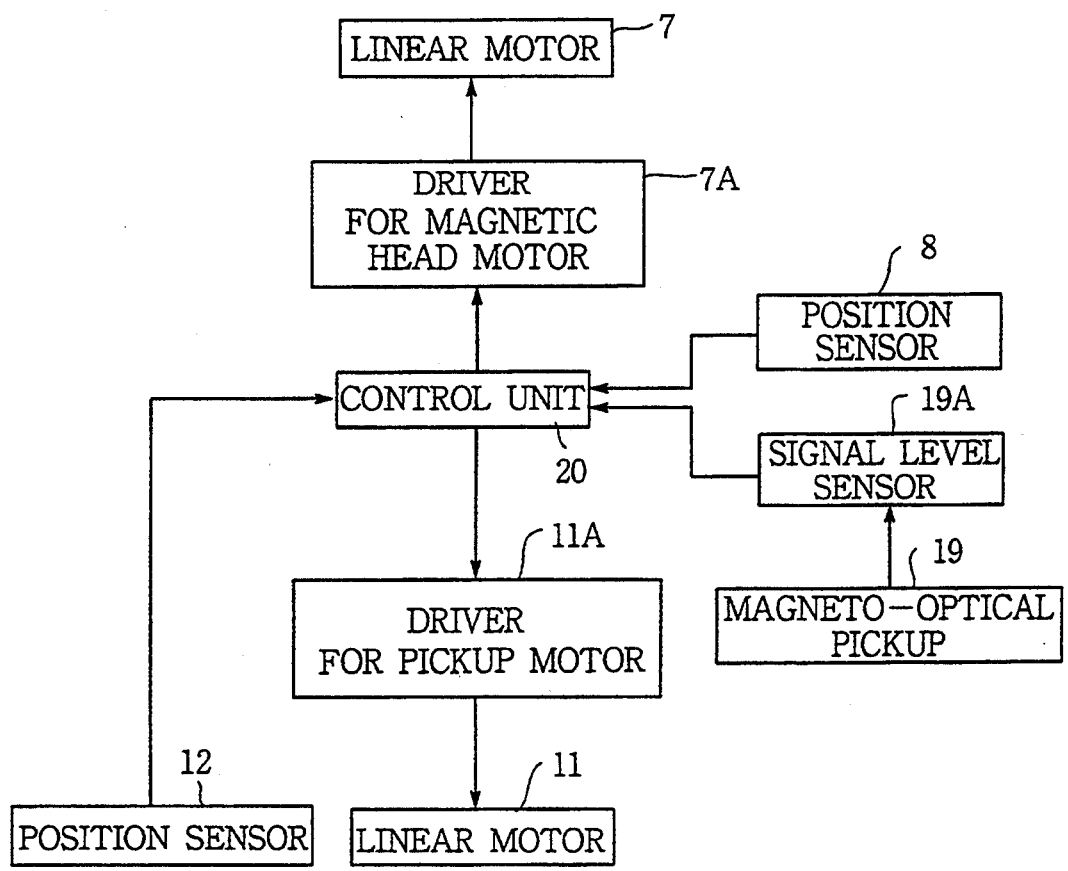
FIG. 2 is a block diagram of a control system of the read-write head of FIG. 1.

Referring to FIG. 2, a system for controlling the read-write head has a control unit 20 to which the output signal of the position sensors 8 and 12 are applied. The control unit 20 applies control signals to the linear motors 7 and 11 through drivers 7A and 11A, respectively, to operate them. The system further has a signal level sensor 19A which detects a level of a signal reproduced by the pickup 19 and applies a level signal to the control unit 20. The control unit 20 further operates the linear motors 7 and 11 in response to the level signal.

Figure 3:
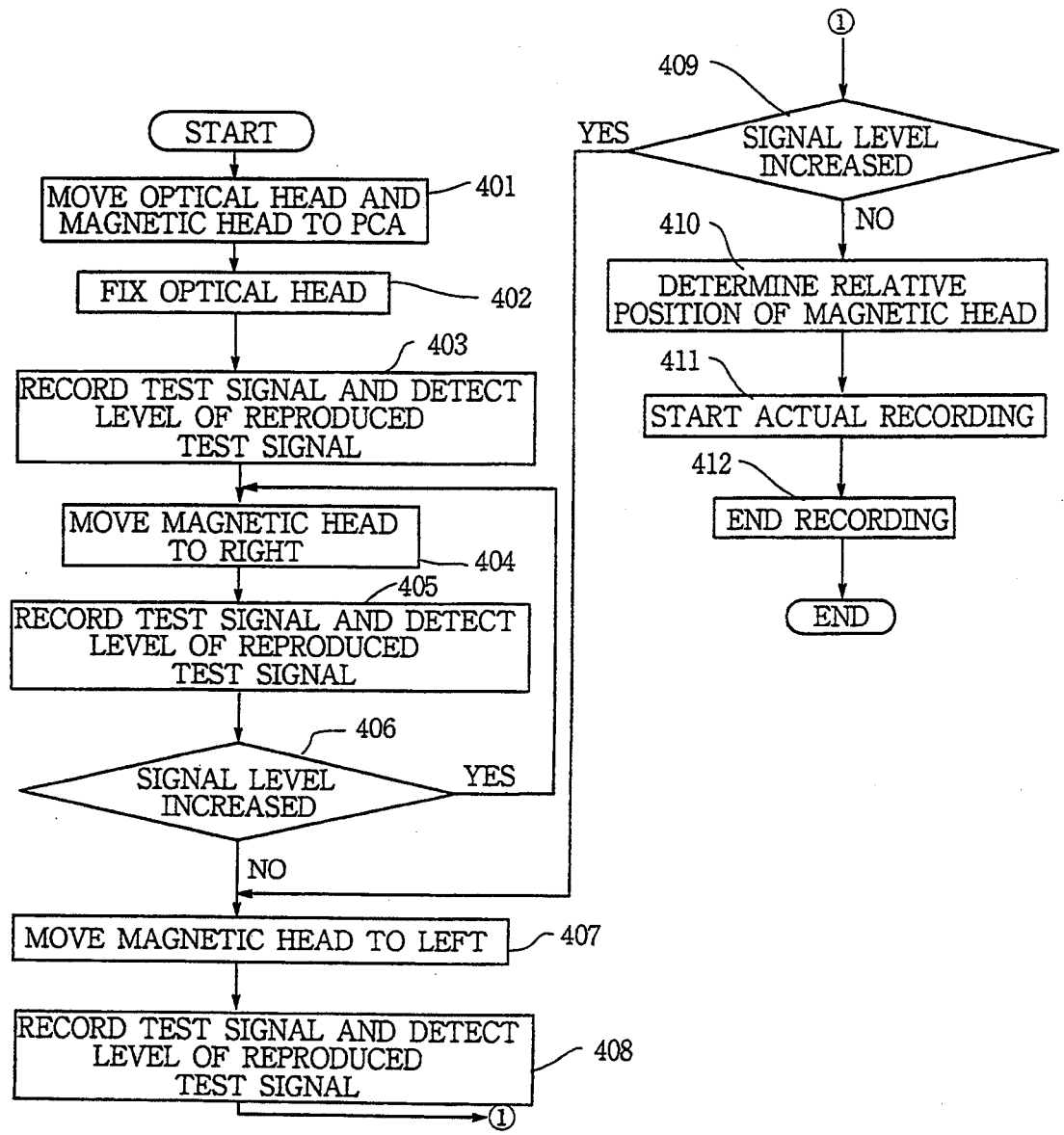
FIG. 3 is a flowchart for explaining the operation of the read-write head of FIG. 1.

The operation of the read-write head for recording information on the disc 14 is described hereinafter with reference to the flowchart of FIG. 3. At a step 401, the linear motors 7 and 11 are driven to move the magnetic head 16 and the optical head 17. The heads 16 and 17 stop when the position sensors 8 and 12 detect positions corresponding to a PCA (Power Calibration Area) which is the innermost of the disc. Thereafter, the optical head 17 is! fixed at a step 402.

At a step 403, the optical pickup 19 generates the laser beam 15 to raise the temperature of the PCA to the Curie temperature. The magnetic flux caused by the electromagnet 13 reverses the direction of the magnetic field on the recording surface of the disc 14, thereby recording a test signal in the PCA. The test signal is reproduced by irradiating a laser beam 15 so as to measure the level of the reproduced signal by the signal level sensor 19A. The magnetic head 16 is slightly moved to the right at a step 404. A test signal is again recorded and reproduced to detect the level thereof at a step 405. It is determined at a step 406 whether the level of the signal detected by the signal level sensor 19A increased. When the level increases, the program returns to the step 404, and the magnetic head 16 is further moved to the right. To the contrary, when the level decreases, the magnetic head 16 is moved to the left at a step 407. Thereafter, the increase of the signal level is again checked at the steps 405 and 406 or at steps 408 and 409. In this manner, the magnetic head 16 is positioned at a location where the signal level becomes maximum, that is to say, where the electromagnet 18 most accurately opposes the optical pickup 19. Thus the optimum position of the magnetic head 16 is obtained. At a step 410, the position sensors 8 and 12 detect the positions of the magnetic head 16 and the optical head 17 on the scales 9 and 13, respectively, so that the relative position of the magnetic head 16 to the optical head 17 is obtained. The relative position is stored in a memory provided in the control unit 20.

At a step 411, the optical head 17 is moved to a program area of the disc 14. The magnetic head 16 is also moved to the position where the relative position determined at the step 410 is maintained. Thereafter, the pickup 19 and the electromagnet 18 are actuated to write information on the disc 14. The recording operation is completed at a step 412.

Thus in accordance with the present invention, the electromagnet 18 is positioned to accurately oppose the optical pickup 19 without the connecting member. Therefore, it is possible to reduce the weight and size of the optical pickup head.

Each of the position sensors 12 and 8 may be a photosensor adapted to detect the position based on modulation of light.

Figure 4:
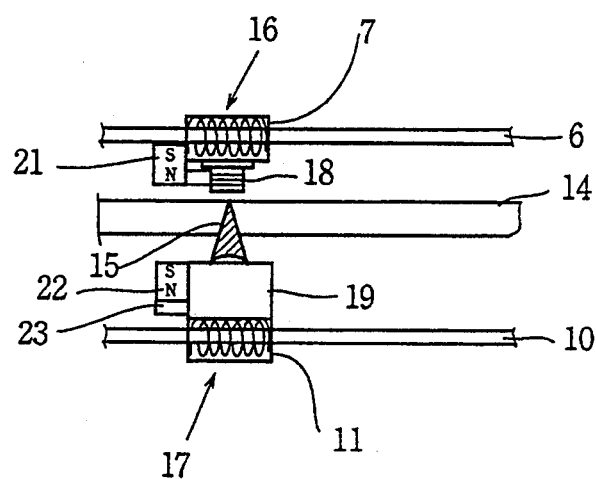
FIG. 4 is a sectional view of a second embodiment of the read-write head of the present invention.

Referring to FIG. 4 showing the second embodiment of the present invention, the magnetic head 16 and the optical head 17 are provided with permanent magnets 21 and 22, respectively, instead of the position sensors 8 and 12. A magnetic force sensor 23 is mounted on one of the magnets 21 and 22 to detect magnetic force between the magnets 21 and 22. In the present embodiment, the optical pickup 19 reads information on the radial position of the disc 14, which is written in each area of the disc.

Figure 5:
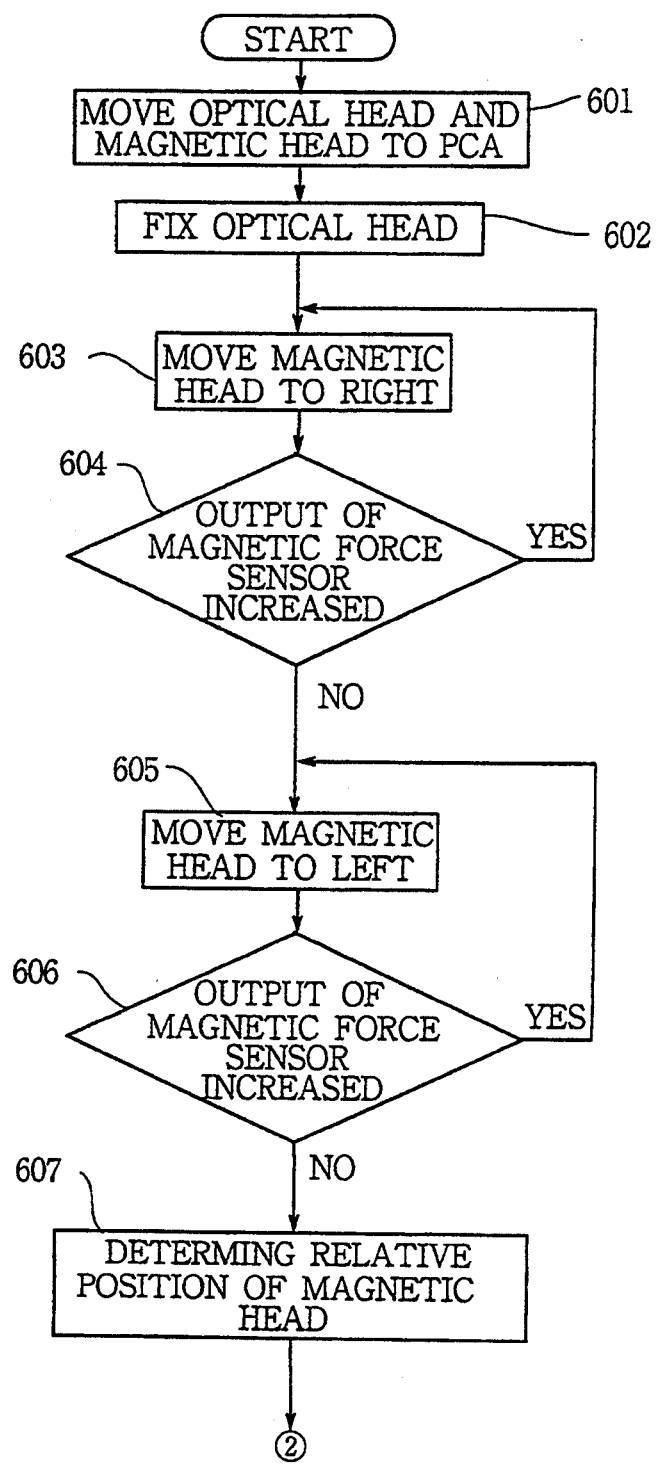
FIGS. 5a and 5b show a flowchart for explaining the operation of the read-write head of FIG. 4.
Figure 5:
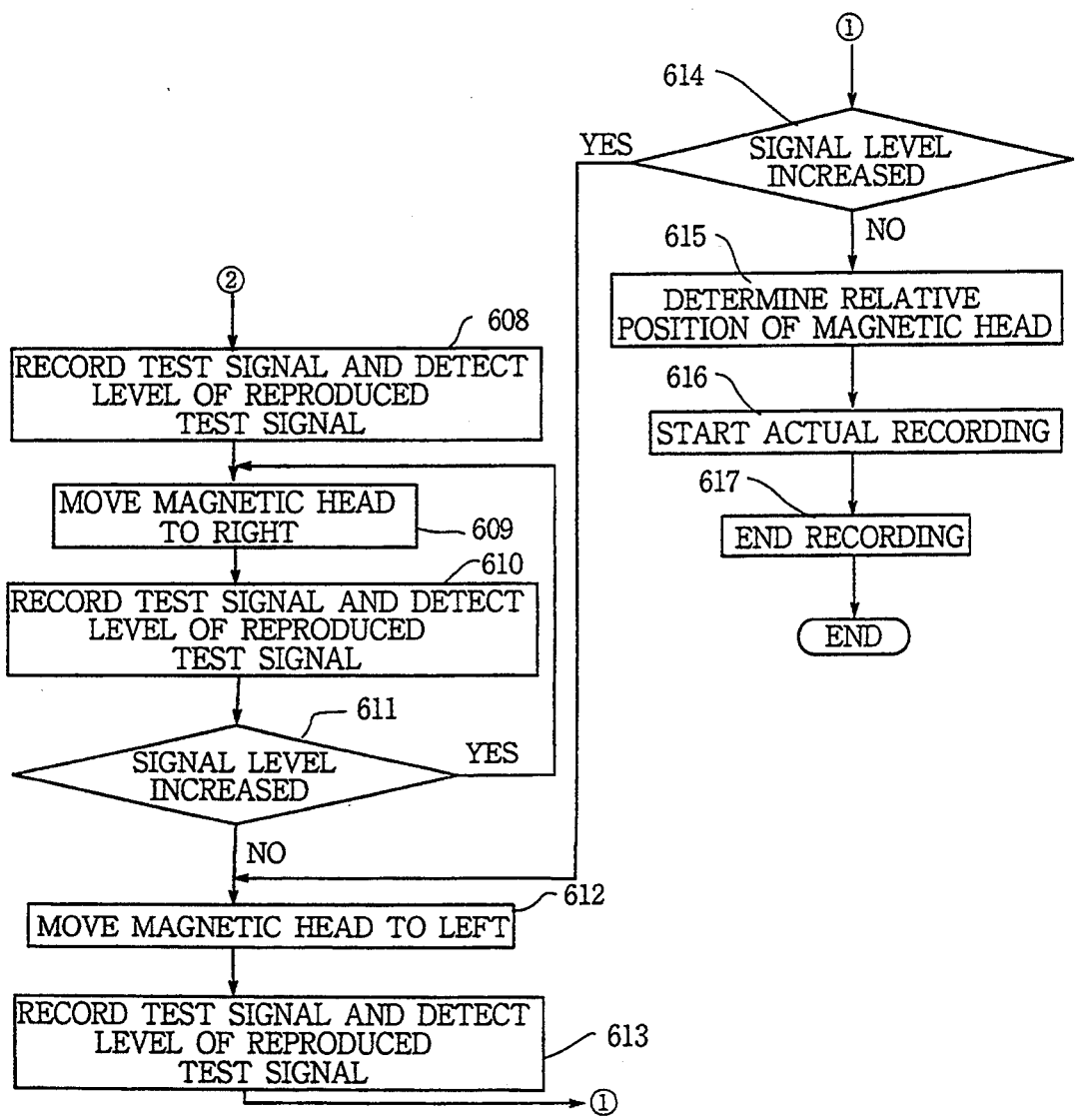
Figure 6:
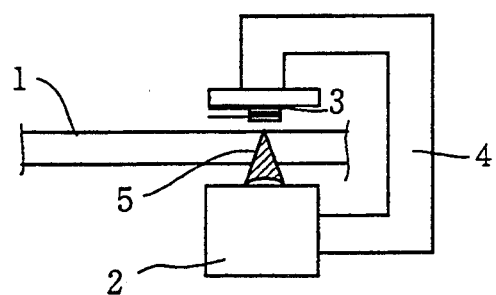
FIG. 6 is a schematic diagram of a conventional read-write head of a magneto-optical disc player.

The operation for recording information with the read-write head of the present embodiment is described hereinafter with reference to FIGS. 5a and 5b. At a step 601, the optical head 17 is moved to the PCA of the disc 14 in accordance with the position information stored in tile PCA. The magnetic head 16 is moved to the same radial position as the optical head 17 by driving the linear motor 7 for a predetermined period. The optical head is fixed at a step 602. The magnetic head 16 is slightly moved to the right at a step 603. It is determined at a step 604 whether the output of the magnetic force sensor 23 increased. When the output increases, the program returns to the step 603, and the magnetic head 16 is further moved to the right. To the contrary, when the magnetic force decreases, the magnetic head 16 is moved to the left at a step 605. Thereafter, the increase of the magnetic force is again checked at the step 604 or at a step 606. Thus, the magnetic head 16 is positioned at a location where the magnetic force between the magnets 21 and 22 becomes maximum, that is to say, where the electromagnet 18 most accurately opposes the optical pickup 19. Hence the optimum relative position of the magnetic head 16 to the optical head 17 is determined at a step 607.

Thereafter, the procedure for determining the relative position of the magnetic head 16 in accordance with the level of the reproduced signal is carried out at steps 608 to 615. These steps are identical to the steps 403 to 410 of FIG. 3 so that the explanation thereof is omitted. Namely, the relative position of the magnetic head 16 and the optical head is determined by the maximum level of the reproduced signal.

At steps 616 and 617, the actual recording of information is performed while maintaining the relative positions of the heads constant, that is at relative positions determined at the step 615.

The magnets 21 and 22 may be electromagnets. The electromagnets are de-energized when reproducing information, thereby decreasing the load exerted on the optical pickup 19.

In the present embodiment, since the position sensors 12 and 8, and the linear scales 13 and 9 are unnecessary, the construction of the read-write head is simplified.

Although the present invention has been described relative to a magneto-optical disc player where information is recorded by magnetically modulating the magnetic field on the surface of the discs, the present invention may be applied to an optical disc player using an optical modulation system for recording.

In accordance with the present invention, each of the upper and lower heads interposing the disc are moved to a desired position dependent on a position detected by the position sensor. Hence the relative positions of the heads are not affected by deformation and abrasion of elements. Accordingly, information can be accurately recorded. Since the heads are not supported by an integral connecting member, each of the magnetic and optical heads can be independently and hence quickly moved, so that a determined area of the disc can be quickly searched. Moreover, a space taken up by the connecting member of the heads is no longer necessary so that the size of the disc player can be reduced.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A read-write head position control system of a magneto-optical disc player comprising:
   recording means for recording a test signal on an optical disc;
   an optical head having an optical pickup;
   a magnetic head having an electromagnet;
   guide means for guiding the optical head and the magnetic head so that each of the heads is independently moved in a radial direction of the optical disc;
   driving means, provided on both heads, for moving both heads along the guide means, respectively;
   detecting means for detecting a relative position between both heads at a position where both heads oppose each other, said detecting means having
      level direction means for detecting a level of a reproduced test signal, and
      relative position means for determining the relative position a) by recording test signals and reproducing recorded test signals while one of said heads is moved in the radial direction of the optical disc and b) by searching for a position where the level of the reproduced test signal becomes a maximum level;
   memory means for storing a detected relative position; and
   control means for controlling movement of both heads, maintaining the relative position at the maximum level.

2. A read-write head position control system according to claim 1, wherein the detecting means is means for detecting levels of reproduced signals of recorded information on the disc.

3. A read-write head position control system according to claim 1 wherein driving means is a linear motor.

4. A read-write head position control system according to claim 1 wherein said optical head and said magnetic head are disposed on opposite sides of said optical disc.

* * * * *